US 7,740,505 B2

(12) United States Patent
McCoy

(10) Patent No.: US 7,740,505 B2
(45) Date of Patent: Jun. 22, 2010

(54) ADAPTER FOR A CONSUMER ELECTRONIC DEVICE WITH AN INFORMATION FUNCTION

(75) Inventor: Richard A. McCoy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 12/235,631

(22) Filed: Sep. 23, 2008

(65) Prior Publication Data

US 2009/0017661 A1    Jan. 15, 2009

Related U.S. Application Data

(63) Continuation of application No. 11/619,731, filed on Jan. 4, 2007.

(51) Int. Cl.
*H01R 24/00* (2006.01)

(52) U.S. Cl. ..................................... 439/660

(58) Field of Classification Search ............ 439/676, 439/660; 361/685–686, 683; 710/303
See application file for complete search history.

(56) References Cited

U.S. PATENT DOCUMENTS

| 273,836 A | 3/1883 | Graeter |
| 486,467 A | 11/1892 | Higgins |
| 2,795,639 A | 6/1957 | Rawson |
| 3,054,024 A | 9/1962 | Van Dillen et al. |
| 3,836,221 A | 9/1974 | Whistler et al. |
| 3,858,091 A | 12/1974 | Wilkinson |
| 4,546,267 A | 10/1985 | Urfirer |
| 4,628,351 A | 12/1986 | Heo |
| 4,691,195 A | 9/1987 | Sigelman et al. |
| 4,718,740 A | 1/1988 | Cox |
| 4,773,032 A | 9/1988 | Uehara |
| 4,814,759 A | 3/1989 | Gombrich et al. |
| 4,884,626 A | 12/1989 | Filipowski |
| 4,969,830 A | 11/1990 | Daly |
| 5,173,686 A | 12/1992 | Fujihara |
| 5,187,744 A | 2/1993 | Richter |

(Continued)

FOREIGN PATENT DOCUMENTS

CN    1683856    10/2005

(Continued)

OTHER PUBLICATIONS

Miller, Robert C, et al., Taking Handheld Devices to the Next Level, 2004, pp. 36-43.

(Continued)

*Primary Examiner*—Jean F Duverne
(74) *Attorney, Agent, or Firm*—Robert A. Bacon; McGarry Bair PC

(57) ABSTRACT

An adapter for removably mounting an electronic image device performing a first informational function to an appliance performing a cycle of operation on a consumer article. The adapter has a main body adapted to removably couple the electronic device to the appliance. The adapter provides a first mechanical support service between the appliance and the electronic device when the adapter is coupled to the appliance and the electronic device is coupled to the adapter and a second mechanical support service to the electronic device when the adapter and the electronic device are removed from the appliance as well as providing a second informational function.

27 Claims, 11 Drawing Sheets

U.S. PATENT DOCUMENTS

| | | | |
|---|---|---|---|
| 5,235,822 A | 8/1993 | Leonovich, Jr. | |
| 5,281,018 A | 1/1994 | Cullinan | |
| 5,305,381 A | 4/1994 | Wang et al. | |
| 5,351,417 A | 10/1994 | Rubin | |
| 5,382,939 A | 1/1995 | Hong | |
| 5,408,382 A | 4/1995 | Schultz | |
| 5,457,745 A | 10/1995 | Wang | |
| 5,544,010 A | 8/1996 | Schultz et al. | |
| 5,568,691 A | 10/1996 | Rubin | |
| 5,644,471 A | 7/1997 | Schultz et al. | |
| 5,699,226 A | 12/1997 | Cavello | |
| 5,739,665 A | 4/1998 | Bares | |
| 5,810,168 A | 9/1998 | Eggering | |
| 5,836,563 A | 11/1998 | Hsin-Yung | |
| 5,839,097 A | 11/1998 | Klausner | |
| 5,864,120 A | 1/1999 | Vroom et al. | |
| 5,996,956 A | 12/1999 | Shawver | |
| 5,999,226 A | 12/1999 | Choi | |
| 6,023,147 A | 2/2000 | Cargin, Jr. et al. | |
| 6,130,727 A | 10/2000 | Toyozumi | |
| 6,131,812 A | 10/2000 | Schneider | |
| 6,208,117 B1 | 3/2001 | Hibi | |
| 6,231,371 B1 | 5/2001 | Helot | |
| 6,246,575 B1 | 6/2001 | Barrus et al. | |
| 6,309,230 B2 | 10/2001 | Helot | |
| 6,359,270 B1 | 3/2002 | Bridson | |
| 6,375,344 B1 | 4/2002 | Hanson et al. | |
| 6,378,537 B1 | 4/2002 | DeHart | |
| 6,393,848 B2 | 5/2002 | Roh et al. | |
| 6,415,036 B1 | 7/2002 | Ritter et al. | |
| 6,430,946 B2 | 8/2002 | Roh et al. | |
| 6,453,687 B2 | 9/2002 | Sharood et al. | |
| 6,480,753 B1 | 11/2002 | Calder et al. | |
| 6,483,695 B1 | 11/2002 | Hartstein | |
| 6,490,154 B2 | 12/2002 | Thompson | |
| 6,519,144 B1 | 2/2003 | Henrie et al. | |
| 6,557,756 B1 | 5/2003 | Smith | |
| 6,559,882 B1 | 5/2003 | Kerchner | |
| 6,608,399 B2 | 8/2003 | McConnell et al. | |
| 6,634,910 B2 | 10/2003 | Lieb et al. | |
| 6,646,866 B2 | 11/2003 | Kao | |
| 6,682,161 B2 | 1/2004 | Yun | |
| 6,761,578 B1 | 7/2004 | Stavely et al. | |
| 6,765,789 B2 | 7/2004 | Yang | |
| 6,785,567 B2 | 8/2004 | Kato | |
| 6,788,529 B2 | 9/2004 | Homer et al. | |
| 6,792,263 B1 | 9/2004 | Kite | |
| 6,809,295 B1 | 10/2004 | Vargas | |
| 6,832,618 B2 | 12/2004 | DeHart | |
| 6,843,667 B2 | 1/2005 | Khoury | |
| 6,853,399 B1 | 2/2005 | Gilman et al. | |
| 6,860,764 B2 | 3/2005 | Khoury | |
| 6,877,264 B2 | 4/2005 | Mautz | |
| 6,927,871 B1 | 8/2005 | Silverbrook et al. | |
| 6,961,239 B2 | 11/2005 | Schedivy | |
| 6,963,936 B2 | 11/2005 | Billington et al. | |
| 6,966,533 B1 | 11/2005 | Kalis et al. | |
| 6,993,615 B2 | 1/2006 | Falcon | |
| 7,034,902 B2 | 4/2006 | Tajima | |
| 7,074,062 B2 | 7/2006 | Khoury | |
| 7,080,253 B2 | 7/2006 | Wadsworth et al. | |
| 7,090,141 B2 | 8/2006 | Roh et al. | |
| 7,092,988 B1 | 8/2006 | Bogatin et al. | |
| 7,094,110 B1 | 8/2006 | Shelton | |
| 7,117,286 B2 | 10/2006 | Falcon | |
| 7,126,569 B2 | 10/2006 | Ootsuka et al. | |
| 7,136,940 B2 | 11/2006 | Roh et al. | |
| 7,146,306 B2 | 12/2006 | Whitney | |
| 7,158,092 B2 | 1/2007 | Shen | |
| 7,219,942 B2 | 5/2007 | Schedivy | |
| 7,272,420 B2 | 9/2007 | Falcon et al. | |
| 7,404,298 B2* | 7/2008 | Kim et al. | 62/126 |
| 7,430,111 B2 | 9/2008 | Lee et al. | |
| 2002/0080273 A1 | 6/2002 | Harrison et al. | |
| 2002/0115353 A1 | 8/2002 | Zeiler et al. | |
| 2002/0115480 A1 | 8/2002 | Huang | |
| 2002/0186329 A1 | 12/2002 | Tong et al. | |
| 2003/0014259 A1* | 1/2003 | Ferragut et al. | 704/272 |
| 2003/0103023 A1 | 6/2003 | Ootsuka et al. | |
| 2003/0207623 A1 | 11/2003 | Patel | |
| 2004/0004807 A1 | 1/2004 | Kim et al. | |
| 2004/0070696 A1 | 4/2004 | Roh et al. | |
| 2004/0093379 A1* | 5/2004 | Roh et al. | 709/203 |
| 2004/0154318 A1 | 8/2004 | Roh et al. | |
| 2004/0177624 A1 | 9/2004 | Wo | |
| 2004/0186596 A1 | 9/2004 | Roh et al. | |
| 2004/0216471 A1 | 11/2004 | Kim et al. | |
| 2004/0262185 A1 | 12/2004 | Mills | |
| 2005/0013103 A1 | 1/2005 | Chandley | |
| 2005/0097912 A1 | 5/2005 | Nam et al. | |
| 2005/0127870 A1 | 6/2005 | Shin | |
| 2005/0129263 A1 | 6/2005 | Tamura et al. | |
| 2005/0134472 A1 | 6/2005 | Jang et al. | |
| 2005/0138948 A1 | 6/2005 | Lee | |
| 2005/0138949 A1 | 6/2005 | Jang et al. | |
| 2005/0201067 A1 | 9/2005 | Hu et al. | |
| 2005/0210168 A1 | 9/2005 | Chen et al. | |
| 2005/0225292 A1 | 10/2005 | Damlamian et al. | |
| 2005/0286900 A1 | 12/2005 | Bentley et al. | |
| 2006/0007357 A1 | 1/2006 | Lee | |
| 2006/0021360 A1 | 2/2006 | Kim et al. | |
| 2006/0031617 A1 | 2/2006 | Falcon | |
| 2006/0055553 A1 | 3/2006 | Yeh | |
| 2006/0096303 A1 | 5/2006 | Kavounas | |
| 2006/0106965 A1 | 5/2006 | Falcon | |
| 2006/0116177 A1 | 6/2006 | Kortum et al. | |
| 2006/0117810 A1 | 6/2006 | Kendall et al. | |
| 2006/0118694 A1 | 6/2006 | Lee et al. | |
| 2006/0125360 A1 | 6/2006 | Kim et al. | |
| 2006/0130078 A1 | 6/2006 | Zhang | |
| 2006/0144056 A1 | 7/2006 | Oh | |
| 2006/0145576 A1 | 7/2006 | Lee et al. | |
| 2006/0148575 A1 | 7/2006 | Vitito | |
| 2006/0217600 A1 | 9/2006 | Lee et al. | |
| 2006/0224050 A1 | 10/2006 | Lee et al. | |
| 2006/0261220 A1 | 11/2006 | Lee et al. | |
| 2007/0038434 A1 | 2/2007 | Cvetko | |
| 2007/0044497 A1 | 3/2007 | Roo et al. | |
| 2007/0086151 A1 | 4/2007 | Oh et al. | |
| 2007/0118862 A1 | 5/2007 | Jeong et al. | |
| 2007/0126413 A1 | 6/2007 | Oh | |
| 2007/0143376 A1 | 6/2007 | McIntosh | |
| 2007/0230910 A1 | 10/2007 | Welch et al. | |
| 2007/0247800 A1 | 10/2007 | Smith et al. | |
| 2008/0013284 A1 | 1/2008 | Nagahashi | |
| 2008/0019082 A1 | 1/2008 | Krieger et al. | |
| 2008/0101645 A1 | 5/2008 | Rosen | |
| 2008/0165504 A1 | 7/2008 | McCoy et al. | |
| 2008/0192411 A1 | 8/2008 | McCoy | |

FOREIGN PATENT DOCUMENTS

| | | |
|---|---|---|
| CN | 1683877 | 10/2005 |
| CN | 1683893 | 10/2005 |
| DE | 3528659 | 2/1987 |
| DE | 19644641 | 4/1998 |
| DE | 19706565 | 8/1998 |
| DE | 19800212 | 7/1999 |
| DE | 19839174 | 3/2000 |
| DE | 10242678 | 4/2004 |
| DE | 102005021937 | 11/2006 |
| EP | 0985884 | 3/2000 |
| EP | 1039441 | 9/2000 |
| EP | 1125537 | 8/2001 |

| | | |
|---|---|---|
| EP | 1152202 | 11/2001 |
| EP | 1205719 | 5/2002 |
| EP | 1258991 | 11/2002 |
| EP | 1384965 | 1/2004 |
| EP | 1450105 | 8/2004 |
| EP | 1600886 | 11/2005 |
| GB | 828064 | 2/1960 |
| GB | 2386177 | 9/2003 |
| JP | 7318237 | 12/1995 |
| JP | 2000274923 | 10/2000 |
| JP | 2001324258 | 11/2001 |
| JP | 2002011274 | 1/2002 |
| JP | 2002243354 | 8/2002 |
| JP | 2002323858 | 11/2002 |
| JP | 2003065659 | 3/2003 |
| JP | 2001289555 | 10/2003 |
| JP | 2003302138 | 10/2003 |
| JP | 2000113315 | 11/2003 |
| JP | 2003319573 | 11/2003 |
| JP | 2003323232 | 11/2003 |
| KR | 2004025403 | 9/2002 |
| KR | 20030077254 | 10/2003 |
| KR | 2006074787 | 12/2004 |
| KR | 20050059869 | 6/2005 |
| KR | 20050070958 | 7/2005 |
| KR | 20050075781 | 7/2005 |
| KR | 20050094242 | 9/2005 |
| KR | 2008057639 | 12/2006 |
| KR | 20070004351 | 1/2007 |
| KR | 20080004129 | 1/2008 |
| WO | 9622718 | 8/1996 |
| WO | 9750045 | 12/1997 |
| WO | 9901971 | 1/1999 |
| WO | 2004051164 | 6/2004 |
| WO | 2004083658 | 9/2004 |
| WO | 2004105184 | 12/2004 |
| WO | 2005047786 | 5/2005 |
| WO | 2005057105 | 6/2005 |
| WO | 2006067530 | 6/2006 |
| WO | 2006068456 | 6/2006 |
| WO | 2006086371 | 8/2006 |
| WO | 2007030664 | 3/2007 |

OTHER PUBLICATIONS

"i-Enabled Appliances", copyright 2001 Whirlpool Corporation, 14 pages, authored by Whirlpool Corporation, published during 2001 by Whirlpool Corporation as a self contained pamphlet. The year of publication is sufficiently earlier than the effective U.S. filed and any foreign priority date so that the particular month of publication is not in issue.

* cited by examiner

ADAPTER FOR A CONSUMER ELECTRONIC DEVICE WITH AN INFORMATION FUNCTION

CROSS REFERENCE TO RELATED APPLICATIONS

The present application is a continuation of U.S. patent application Ser. No. 11/619,731, filed Jan. 4, 2007, entitled "ADAPTER AND CONSUMER ELECTRONIC DEVICE FUNCTIONAL UNIT."

BACKGROUND OF THE INVENTION

The invention relates to an adapter for removably coupling an electronic image device to a host or an appliance.

Traditionally, appliances, consumer electronic devices, and other useful household machinery is located in a room dedicated to the function supported by the appliance. For example, the kitchen has traditionally been limited to a space for preparing and eating meals and consequently has been mostly occupied by cabinetry and large home appliances such as refrigerators, dishwashers, and ovens. The family room has been designated as a place for leisure activities, and so most entertainment devices, such as televisions and video games are commonly found here. Laundry rooms normally house a washer, dryer, and iron. Devices such as personal computers and printers are often located in another room, such as a dedicated home office or bedroom.

Consumers increasingly own multiple hand-held or portable consumer electronic devices, such as laptops, cell phones, PDAs, and digital music players. These devices are typically used in many different rooms in the house and are often carried from room to room throughout the home. Consumers also tend to perform non-traditional tasks in the traditional rooms of the home. For example, consumers also tend to eat in the living room or media room, instead of the dining room. Consumers tend to eat, meet and entertain in the kitchen, not just the dining room and family room. In fact, the kitchen is often the hub of most household activity. Consumers also tend to work in every room of the home with the adoption of laptop computers and wireless networks.

Therefore, there is a trend for consumers to perform non-traditional functions in a household room designed for a traditional function. The invention recognizes this trend and attempts to support the trend.

SUMMARY OF THE INVENTION

An adapter is disclosed for removably mounting an electronic image device performing a first informational function to an appliance performing a cycle of operation on a consumer article. The adapter has a main body adapted to removably couple the electronic device to the appliance, The adapter provides a first mechanical support service between the appliance and the electronic device when the adapter is coupled to the appliance and the electronic device is coupled to the adapter and a second mechanical support service to the electronic device when the adapter and the electronic device are removed from the appliance as well as providing a second informational function.

DESCRIPTION OF THE EMBODIMENTS OF THE INVENTION

Figure 1:
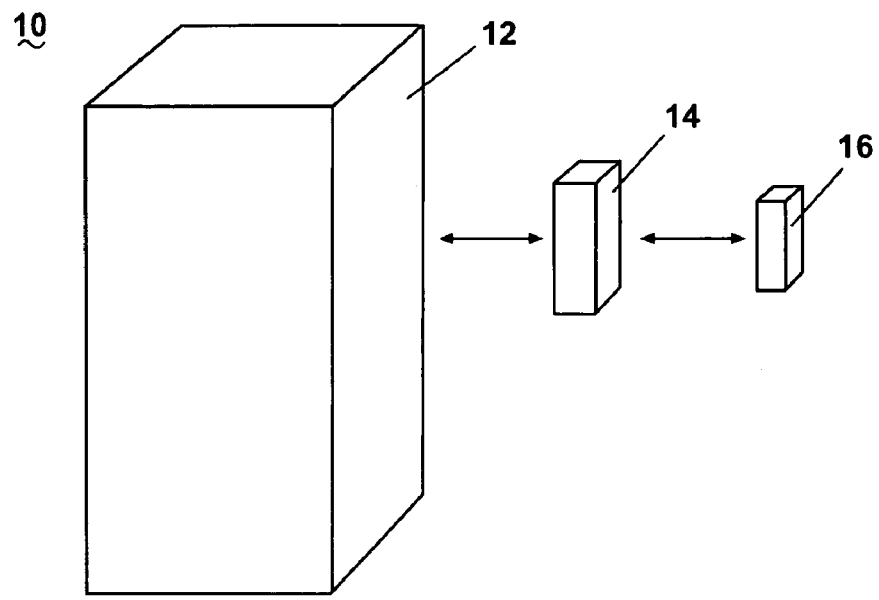
FIG. 1 is a schematic illustration of a modular system comprising a host, an adapter, and a consumer electronic device.

Referring to FIG. 1, a schematic illustration of a modular system 10 according to the invention is shown and comprises at least one host 12, at least one adapter 14, and at least one consumer electronic device 16. The host 12 and the consumer electronic device 16 cannot be directly coupled with each other, and thus are indirectly coupled via the adapter 14. The term "coupled" as used herein includes any type of connection that permits a transfer of a service, as hereinafter defined, between any combination of the host 12, adapter 14, and consumer electronic device 16. The term "coupled" includes both a fixed and removable coupling, unless expressly stated otherwise.

The host 12 performs a primary function and can provide or receive at least one service to or from the adapter 14 or the consumer electronic device 16. The host 12 can be an appliance, and the primary function can be performing a series of steps to conduct a useful cycle of operation. The host 12 can also comprise a structural feature of a building, such as a wall. Preferably, the appliance is a conventional household appliance, such as a refrigerator performing a cooling cycle or an ice making cycle. Other examples of appliances the host 12 can comprise include, but are not limited to, a freezer, a microwave oven, a dishwashing machine, a stove, a range, an air conditioner, a dehumidifier, a water heater, a furnace, a clothes washing machine, a clothes dryer, a clothes refreshing machine, and a non-aqueous washing apparatus, or any combination thereof.

The consumer electronic device 16 is a device that also performs a primary function. In most cases, the primary function of the consumer electronic device is different from the primary function performed by the host 12. Examples of the consumer electronic device 16 include, but are not limited to, a television, a video camera, a video recorder, a personal computer, a notebook computer, a computer monitor, a video display, a keyboard, a printer, copying equipment, a calculator, a facsimile machine, a scanner, a digital storage device, a wireless transceiver, an internet router, a power supply, a data recorder, an answering machine, a telephone, a cordless telephone, a cellular telephone, a video game system, a personal digital assistant, a DVD player, VHS player, a VCR, a cassette deck, an 8 mm video player, a CD player, a Blackberry, a portable digital video player, an MP3 player, a radio, other music players, an audio speaker, a digital picture frame, a weather station, and a scale or balance.

The adapter 14 supplies at least one service to either the host 12 or the consumer electronic device 16. The supply of the service can be uni-directional in that the adapter 14 supplies a service provided by one of the host 12 and the consumer electronic device 16 to the other of the host 12 and the consumer electronic device 16. The supply of the service can also be bi-directional in that the adapter 14 can supply a service from the host 12 to the consumer electronic device 16 and from the consumer electronic device 16 to the host 12. The adapter 14 itself can provide a service that is supplied to the host 12, the consumer electronic device 16, or both, either uni-directionally or multi-directionally. The service supplied by the adapter 14 can be of the same type or a different type than that supplied by either the host 12 or the consumer electronic device 16.

The adapter 14 can comprise one or more adapter members. Exemplary types of adapter members can include, but are not limited to, extenders and device holders. In general, an extender extends the service provided by the host 12, the adapter 14, or the consumer electronic device 16. An extender can be coupled between the host 12 and another adapter 14, between the host 12 and the consumer electronic device 16, between two other adapters 14, or between another adapter 14 and the consumer electronic device 16 to extend the service. Extenders are useful to allow the adapter 14 to be coupled to one surface of the host 12, while the consumer electronic device 16 is coupled to a different surface of the host 12 or to simply increase the distance between the host 12 and the consumer electronic device 16. Device holders physically support the consumer electronic device 16.

Exemplary services that the adapter 14 can supply include mechanical communication, power communication, and data communication. Mechanical communication is the physical coupling of two objects, such as between any combination of the host 12, the adapter 14, and the consumer electronic device 16. The mechanical communication includes direct and indirect physical mounting, unless expressly stated otherwise. Physical coupling includes a fixed or removable mounting, unless expressly stated otherwise. Power communication is the coupling of two objects to supply power to at least one of the objects. Data communication is the coupling of two objects to transmit data to at least one of the objects or exchange data between the objects. The mechanical, power, and data communication includes both uni-directional and multi-directional communication, unless stated otherwise, between any combination of the host 12, the adapter 14, and the consumer electronic device 16. The power and data communication includes wired and wireless communication, unless stated otherwise.

Illustrative applications of the services include the physical mounting of the consumer electronic device 16 to either the host 12 or adapter 14 to place them in mechanical communication with each other. Power communication can include supplying power to the consumer electronic device 16 from either the host 12 or adapter 14 during operation as well as charging the consumer electronic device 16 for later use. Wireless power communication can comprise any types of wireless power communication, including, without limitation for illustration purposes, microwave transmission, laser transmission, acoustical transmission, and magnetic fields. Data communication can include exchanging data between the host 12 or the adapter 14 and the consumer electronic device 16. Wireless data communication can comprise any type of wireless data communication, including, without limitation for illustration purposes, wireless network (a/k/a Wi-Fi), radio transmission, light transmission, and acoustical transmission.

Each service can comprise multiple categories of the service, where one category of a service is different in some way from another category of the same service. As an example, two possible categories of mechanical communication are hanging the consumer electronic device 16 as opposed to docking the consumer electronic device 16. Exemplary categories of power communication include the type of power, e.g. AC or DC, supplied to the consumer electronic device 16 and variations in the characteristics of the power, such as the voltage or current. Exemplary categories of data communication include encrypted and unencrypted data. Data communication also includes communication for different protocols, including physical layer protocols and software layer protocols. Examples for physical layer protocols are a wired Ethernet and a wireless (Wi-Fi) network, both of which support the same data packet structure. The adapter 14 could effect communication between these two physical layers. Examples of software layer protocol are Zigbee and Bluetooth. The adapter 14 can be used to transform either of the Zigbee and Bluetooth data packets into the other of the Zigbee and Bluetooth data packets to effect communication between devices using a different protocol.

The adapter 14 can be configured to transform the service that it supplies. For example, the adapter 14 could be configured to transform the power supplied by changing the voltage or amount of available power. An anticipated transformation would be to change the voltage of the power provided to the adapter 14 to another voltage that the adapter 14 supplies. Another anticipated transformation is the changing of AC power to DC. The data communication could be transformed such that the adapter 14 changes unencrypted data to encrypted data or a standard communication protocol to a proprietary protocol. Other anticipated transformations include the changing from wired power to wireless power, from wired data to wireless data, or from standard power or standard data to power with imbedded data.

The service supplied by the adapter 14 can be provided at least in part by the host 12. For example, the mechanical communication for the consumer electronic device 16 can be provided in part by a horizontal or vertical surface of the host 12, the power supplied by the adapter 14 can be provided through a power connection between the host 12 and an external power source, such as a mains electricity supply, and the data transferred by the adapter 14 can by provided by the host 12, such as from the host controller, or through a data connection between the host 12 and an external source, such as a computer network, a telecommunication network, or another appliance.

Alternately, the service supplied by the adapter 14 can be provided at least in part by the use environment. The use environment, as used herein, is the area surrounding the host 12. For example, in the case where the host 12 is an appliance, the use environment can be a nearby wall of a building or similar structural feature. The use environment can include sources of power and data, such as a mains electricity supply or a computer network.

The term "provide," and any variation thereof, as used herein denotes the source of the service relative to the modular system 10, and is not limited to the "provider" being the origin of the service. In other words, providing is used to denote the source of the service relative to the host 12, the adapter 14, and the consumer electronic device 16, regardless of whether the service originates with the object that provides the service. The object that provides the service can simply be passing on the service. For example, for a host 12 comprising an appliance that provides the service of power communication, the appliance can simply pass on electricity it receives from a household outlet. However, the same appliance can provide another service that originates with the appliance, such as mechanical communication where the adapter 14 and the consumer electronic device 16 are physically coupled to the appliance. Moreover, the object that the service is provided to is not necessarily the end receiver of the service. The service can simply be transmitted through the object that is provided with the service. An object, such as the adapter 14, can be provided with the service, such as from the host 12, and can transmit or supply the service, such as to the consumer electronic device 16.

The host 12 and the consumer electronic device 16 each comprise at least one service interface, respectively referred to herein as a host service interface and a device service interface. The service interfaces can be integrally formed with the host 12 or consumer electronic device 16, or it can be an add-on device. The service interfaces can be removable or non-removable from the host 12 or consumer electronic device 16. At least one service can be provided to the adapter 14 through the host service interface, the device service interface, or both, and the adapter 14 can in turn supply that service through the other of the host service interface and the device service interface. As an example, for a uni-directional service where the service is provided to from the host 12 to the consumer electronic device 16 via the adapter 14, the service can be supplied to the adapter 14 through the host service interface, and to the consumer electronic device 16 through the device service interface.

While the device service interface and host service interface can be the same, it is anticipated that, in most cases, the device service interface will be different from the host service interface. The term "different," when used to describe the host and device service interfaces, means that the host service interface and device service interface cannot be directly coupled without one or both of the interfaces losing some functionality. Different can also mean that the two service interfaces are incompatible. For example, the host service interface and the device service interface can have different physical connectors for one or more of the services, thereby necessitating the adapter 14 to couple the physical connectors to establish the appropriate communication for the service.

The adapter 14 can comprise at least one component that enables a service to be supplied between the host 12 and the consumer electronic device 16. The adapter component can provide, supply, or receive at least one service. A single adapter component can enable the supply of only one service to the consumer electronic device 16 or it can enable the supply of multiple services to the consumer electronic device 16. The adapter 14 can be provided with multiple adapter components that each enable the supply of a different service to the consumer electronic device 16. One or more adapter components can form an adapter service interface, similar to the host or device service interface, and can couple with the host service interface, the device service interface, or another adapter service interface to provide, transmit, or supply at least one service.

The adapter component can couple with the host 12, the consumer electronic device 16, or neither. The adapter component can comprise a connector component, such as a connector component that forms a part of a service interface, that enables the supply of the service through a physical coupling with the host 12, consumer electronic device 16, or another adapter 14, e.g. a plug fitting into a socket to enable power delivery, or through a non-physical coupling with the host 12, consumer electronic device 16, or another adapter 14, e.g. a wireless connection to enable data transfer. The adapter 14 can comprise a non-coupling component. The adapter component can comprise a transformative component, such as an electrical transformer, for changing the voltage of the power supply or an inverter to change the power from DC to AC. The adapter component can comprise a service interface that couples with a host service interface or a device service interface.

The adapter 14 can further comprise a functionality unrelated to supplying the service between the host 12 and consumer electronic device 16. The adapter functionality can operate independently of the host 12 and the consumer electronic device 16, or it can enhance one or more of the functions of the host 12 and the consumer electronic device 16. The functionality can be effected by one or more components of the adapter 14. Examples of adapter functionality include, but are not limited to, consumer electronic device, a speaker, a user interface, a display projection, a media manager, a whiteboard, physical storage, application software hosting, communications routing, power storage, microphone, and data storage. An adapter 14 with consumer electronic device functionality incorporates the entire functionality of one or more consumer electronic device as a function of the adapter 14. An adapter 14 with speaker functionality comprises at least one audio speaker that intensifies and makes speech or music audible. An adapter 14 with user interface functionality comprises a display and/or an input area that allows to user to interface with the host 12, adapter 14, consumer electronic device 16, or an external source. An adapter 14 with calendar projection functionality allows a calendar or schedule to be projected visually or audibly. An adapter 14 with media manager functionality allows a user to manage all types of media (e.g. music, video, pictures, etc.). An adapter 14 with whiteboard functionality comprises a conventional whiteboard for temporarily writing messages and can be available to the user only when a consumer electronic device 16 is not coupled to the adapter 14 or can be available at all times to the user. An adapter 14 with physical storage functionality comprises a storage compartment for storing items, and may be particularity useful for storing companion items for the consumer electronic devices 16, such as a remote control for a consumer electronic device comprising a television or DVDs for a consumer electronic device comprising a DVD player. An adapter 14 with power storage functionality comprises a source of stored power, such as a rechargeable battery. An adapter with data storage functionality comprises means for storing data, such as a hard drive.

The adapter 14 can comprise more than one type of functionality. For example, the whiteboard functionality can be combined with the physical storage functionality for storing items commonly associated with whiteboards, such as dry-erase markers and erasers.

Figure 2:
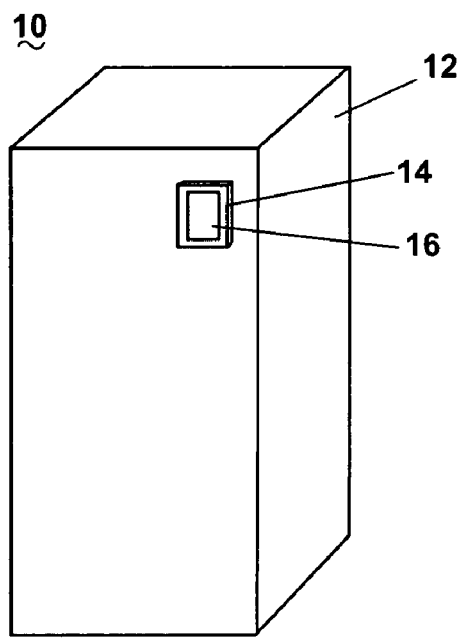
FIG. 2 is a schematic illustration of a configuration of the modular system from FIG. 1, showing the consumer electronic device coupled with the host via the adapter.

Referring now to the schematic illustration of one configuration of the modular system 10 shown in FIG. 2, the consumer electronic device 16 is coupled with the host 12 via the adapter 14. The consumer electronic device 16 is physically coupled with the adapter 14, which is in turn physically coupled with the host 12. In this way, the adapter 14 is in mechanical communication with the host 12, and the consumer electronic device 16 is in mechanical communication with the adapter 14, which places the consumer electronic device 16 in mechanical communication with the host 12. Thus, the mechanical communication is direct between the adapter 14 and both the host 12 and consumer electronic device 16 and indirect between the consumer electronic device 16 and the host 12.

The consumer electronic device 16 can be provided with a user interface 17 to enable the user to interact with the consumer electronic device 16 or receive a functional output from the consumer electronic device 16. The user interface 17 can comprise a video display, a touch screen, control knobs or buttons, a data display, a keypad, a printer or facsimile page output, a microphone, a speaker, a video or still camera, and the like.

Figure 3:
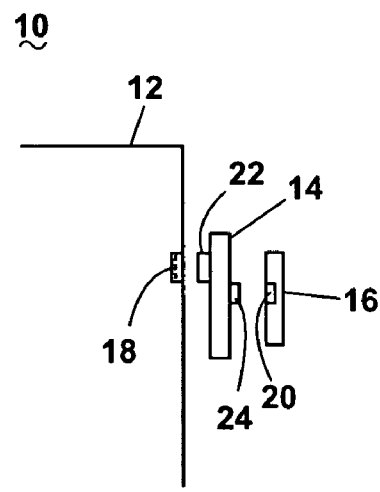
FIG. 3 is a schematic side illustration of the modular system from FIG. 1, showing the adapter and consumer electronic device exploded from the host.

Referring to FIG. 3, a schematic exploded side view of the modular system 10 is shown, where the host 12 comprises a host service interface 18 that couples with a first component or first adapter service interface 22 of the adapter 14, and the consumer electronic device 16 comprises a device service interface 20 that couples with a second component or second adapter service interface 24 of the adapter 14. At least one service is provided to the adapter 14 through the coupling with the host service interface 18 or the device service interface 20. At least one service is supplied to the consumer electronic device 16 through the device service interface 20 or to the host 12 through the host service interface 18, or, in the case of a multi-directional service, both.

It is anticipated that a common implementation will include a single host 12, a single adapter 14, and a single consumer electronic device 16. However, it is within the scope of the invention for one or all of the host 12, adapter 14, and consumer electronic device 16 to be in a plural arrangement. An illustrative example includes multiple hosts 12 concurrently coupled to one consumer electronic device 16 by one or more adapters 14. Another illustrative example includes multiple consumer electronic devices 16 coupled to a single host 12 by one or more adapters 14.

For a modular system comprising multiple hosts 12, each of the hosts 12 can be provided with a common, standardized host service interface 18. For example, competing home appliance manufactures may have different host service interfaces 18, but each manufacturer may carry the same standardized host service interface 18 throughout its own line of home appliances. For a modular system with multiple adapters 14 and a single host 12, the host 12 can interchangeably couple with any one of the adapters 14. The multiple adapters 14 preferably have a standardized component that is received by the host service interface 18 so that the host 12 can interchangeably receive the adapters 14. Manufacturers of the consumer electronic devices 16 may also choose to carry a standardized device service interface 20 throughout its own line of consumer electronic devices 16. Therefore, different adapters 14 can be provided for coupling the standardized interface for a consumer electronic device 16 of one manufacturer to the standardized interface of an appliance for another manufacturer and enabling the communication of a service therebetween. This eliminates the need for all manufacturers of the consumer electronic devices 16 to use the same standardized interface and increases the utility of the hosts 12 and the consumer electronic devices 16.

Specific embodiments of modular systems containing these features, as well as some additional features will now be described. Other examples of modular systems are described in the following related applications: U.S. patent application Ser. No. 11/619,900 entitled "System for Supplying Service from an Appliance to Multiple Consumer Electronic Devices"; U.S. patent application Ser. No. 11/619,754 entitled "System for Connecting Mechanically Dissimilar Consumer Electronic Devices to an Adaptor or a Host"; U.S. patent application Ser. No. 11/619,836 entitled "Appliance with an Adapter to Simultaneously Couple Multiple Consumer Electronic Devices"; U.S. patent application Ser. No. 11/619,907 entitled "Appliance with an Electrically Adaptive Adapter to Alternately Couple Multiple Consumer Electronic Devices"; U.S. patent application Ser. No. 11/619,922 entitled "A Removable Adapter Providing a Wireless Service to Removable Consumer Electronic Device"; U.S. patent application Ser. No. 11/619,894 entitled "Host with Multiple Adapters for Coupling Consumer Electronic Devices"; U.S. patent application Ser. No. 11/619,806 entitled "An Adapter for Coupling a Host and a Consumer Electronic Device Having Dissimilar Standardized Interfaces"; U.S. patent application Ser. No. 11/619,817 entitled "Host with Multiple Sequential Adapters for Multiple Consumer Electronic Devices"; U.S. patent application Ser. No. 11/619,845 entitled "Alternative Hosts for Multiple Adapters and Multiple Consumer Electronic Devices"; U.S. patent application Ser. No. 11/619,850 entitled "Appliance Door with a Service Interface"; U.S. patent application Ser. No. 11/619,912 entitled "Door with a Service Interface on an Edge"; U.S. patent application Ser. No. 11/619,873 entitled "A Dispenser with a Service Interface for a Consumer Electronic Device"; U.S. patent application Ser. No. 11/619,904 entitled "Service Supply Module and Adapter for a Consumer Electronic Device"; U.S. patent application Ser. No. 11/619,767 entitled "Adapter for Docking a Consumer Electronic Device in Discrete Orientations"; U.S. patent application Ser. No. 11/619,772 entitled "Host and Adapter for Selectively Positioning a Consumer Electronic Display in Visible and Concealed Orientations"; U.S. patent application Ser. No. 11/619,775 entitled "Host and Adapter for Selectively Positioning a Consumer Electronic Device in Accessible and Inaccessible Orientations"; U.S. patent application Ser. No. 11/619,718 entitled "Functional Adapter for a Consumer Electronic Device"; U.S. patent application Ser. No. 11/650,222 entitled "Acoustic Chamber as Part of Adapter or Appliance"; and U.S. patent application Ser. No. 11/649,932 entitled "Electrical Accessory Charging Compartment for a Cabinet and Retrofit Components Therefor", all of which are incorporated herein by reference in their entirety.

In one embodiment, the adapter 14 and the consumer electronic device 16 form a functional unit when removed from the host 12. When removed from the host 12, the adapter 14 supplies to the consumer electronic device 16 at least one service that enables the consumer electronic device 16 to function or be of use in the same manner or different manner as when coupled to the host 12. The service supplied to the consumer electronic device 16 by the adapter 14 when removed from the host 12 can be provided by the adapter 14, an external provider, or a combination thereof. Furthermore, the service supplied to the consumer electronic device 16 by the adapter 14 when removed from the host 12 can be the same service or a service different than the service supplied between the consumer electronic device 16 and the host 12 when coupled to the host 12. The service supplied to the consumer electronic device 16 by the adapter 14 when removed from the host 12 can comprise multiple services, which can include at least one of the aforementioned mechanical communication, electrical communication, and data communication.

Figure 4:
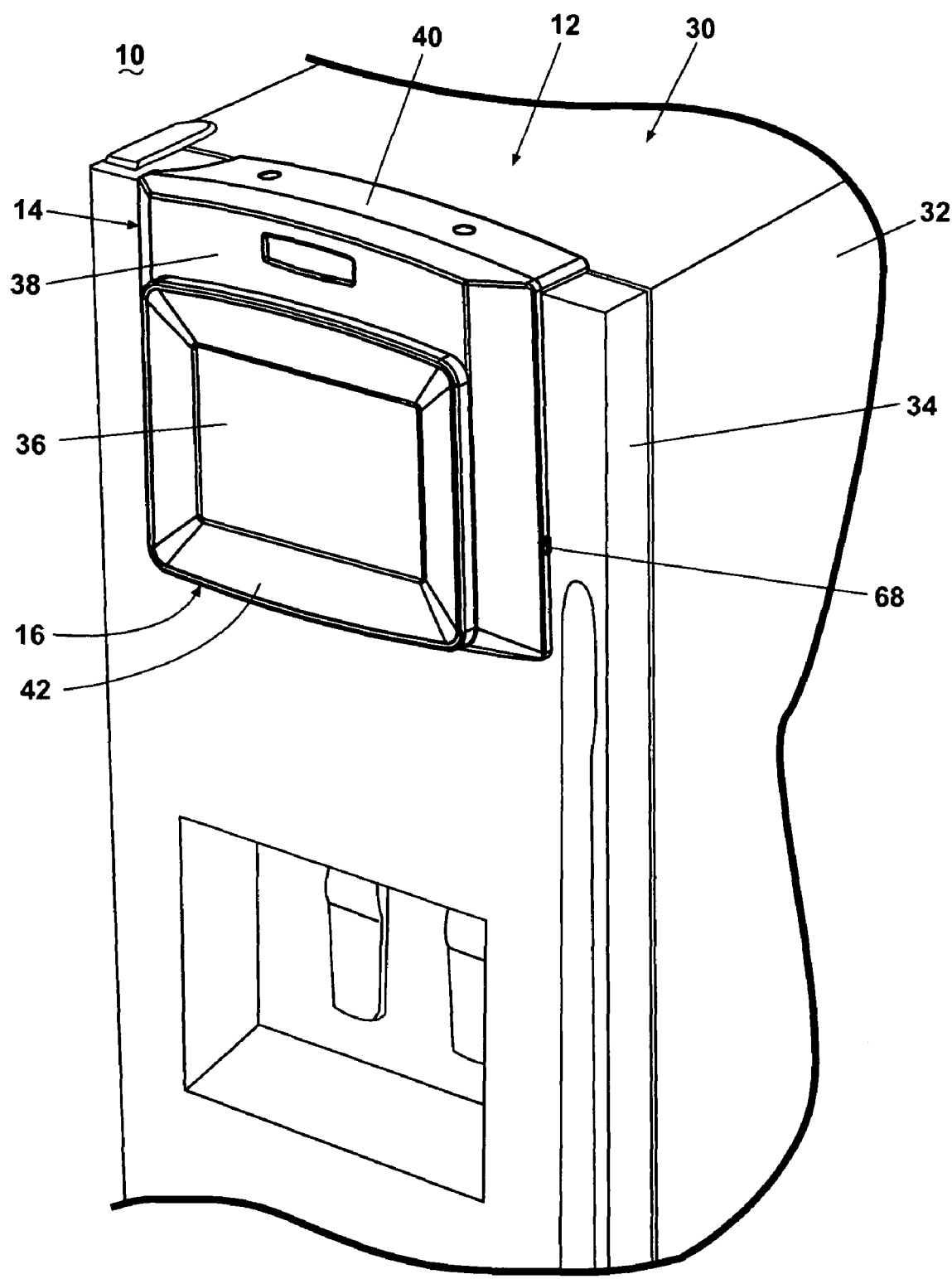
FIG. 4 is a front perspective view of an embodiment of the modular system of FIG. 1 comprising a refrigerator as the host, the adapter, and a digital image display as the consumer electronic device.
Figure 5:
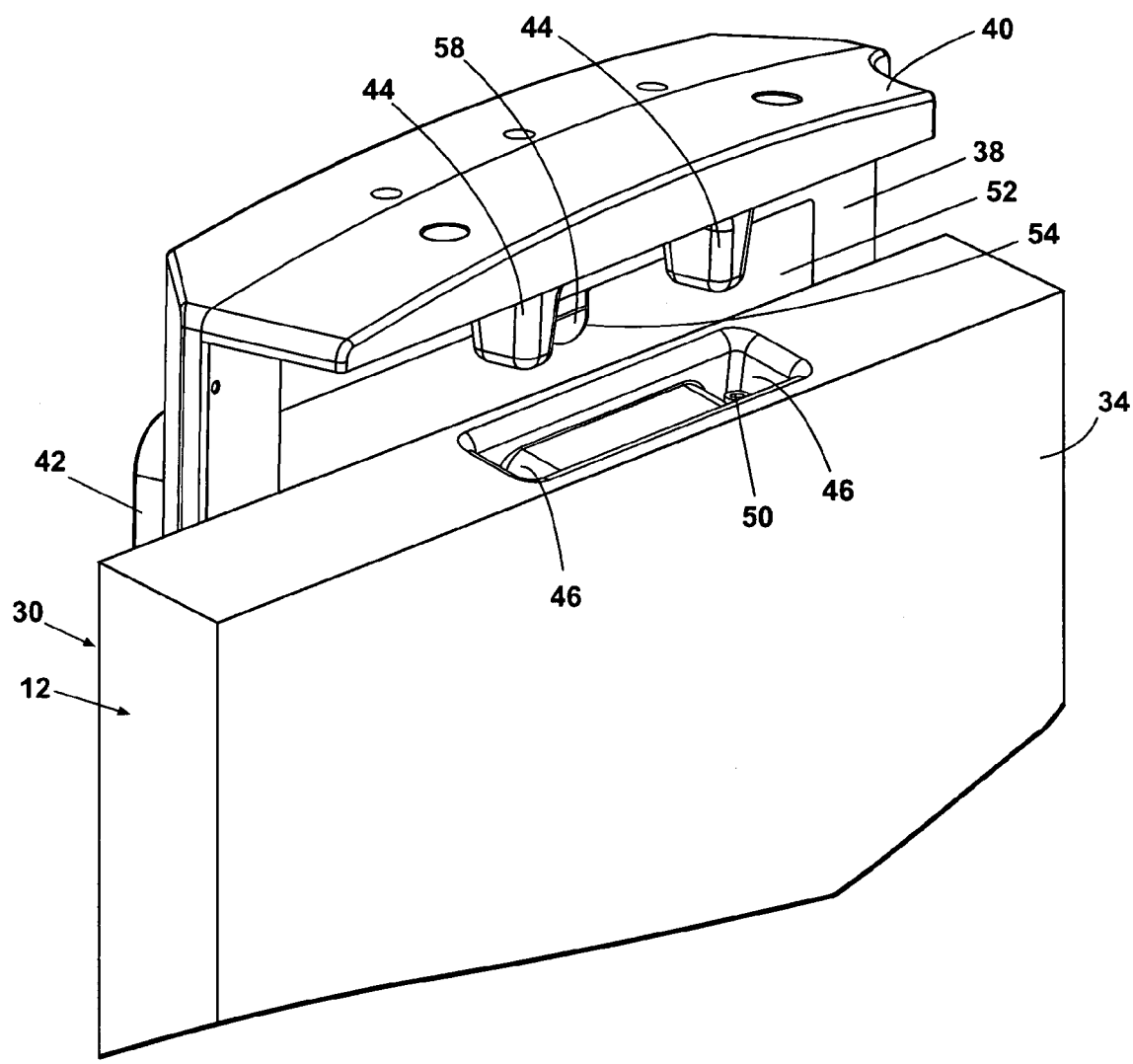
FIG. 5 is a rear perspective view of the modular system of FIG. 4.

Referring now to FIG. 4, an embodiment of the modular system 10 having the functional unit comprises the host 12 in the form a household appliance, particularly a refrigerator 30 having a cabinet 32 and a door 34, and the consumer electronic device 16 in the form of a digital image display 36, also known as a digital picture frame, coupled to the door 34 by the adapter 14. The adapter 14 comprises a main body 38 depending from an upper flange 40. The main body 38 includes a frame 42 that circumscribes the digital image display 36, which sits behind the frame 42. The digital image display 36, which can display still and/or moving images, and the frame 42 together have an appearance similar to that of a picture frame. The upper flange 40 rests on an upper surface of the door 34 and, as shown in FIG. 5, includes a pair of downwardly extending anchors 44 that are received within corresponding anchor receivers 46 in the upper surface of the door 34. Together, the upper flange 40 and the anchors 44 form a mechanical coupling or hanger to hang the adapter 14 and the digital image display 36 from the door 34. Each of the anchors 44 include a downwardly open receptacle 48A, 48B configured to receive a corresponding plug 50 located in the anchor receivers 46. The receptacles 48A, 48B and plugs 50 mate when the adapter 14 is mounted to the door 34 to establish power and data communication, as will be described in more detail below.

Figure 6:
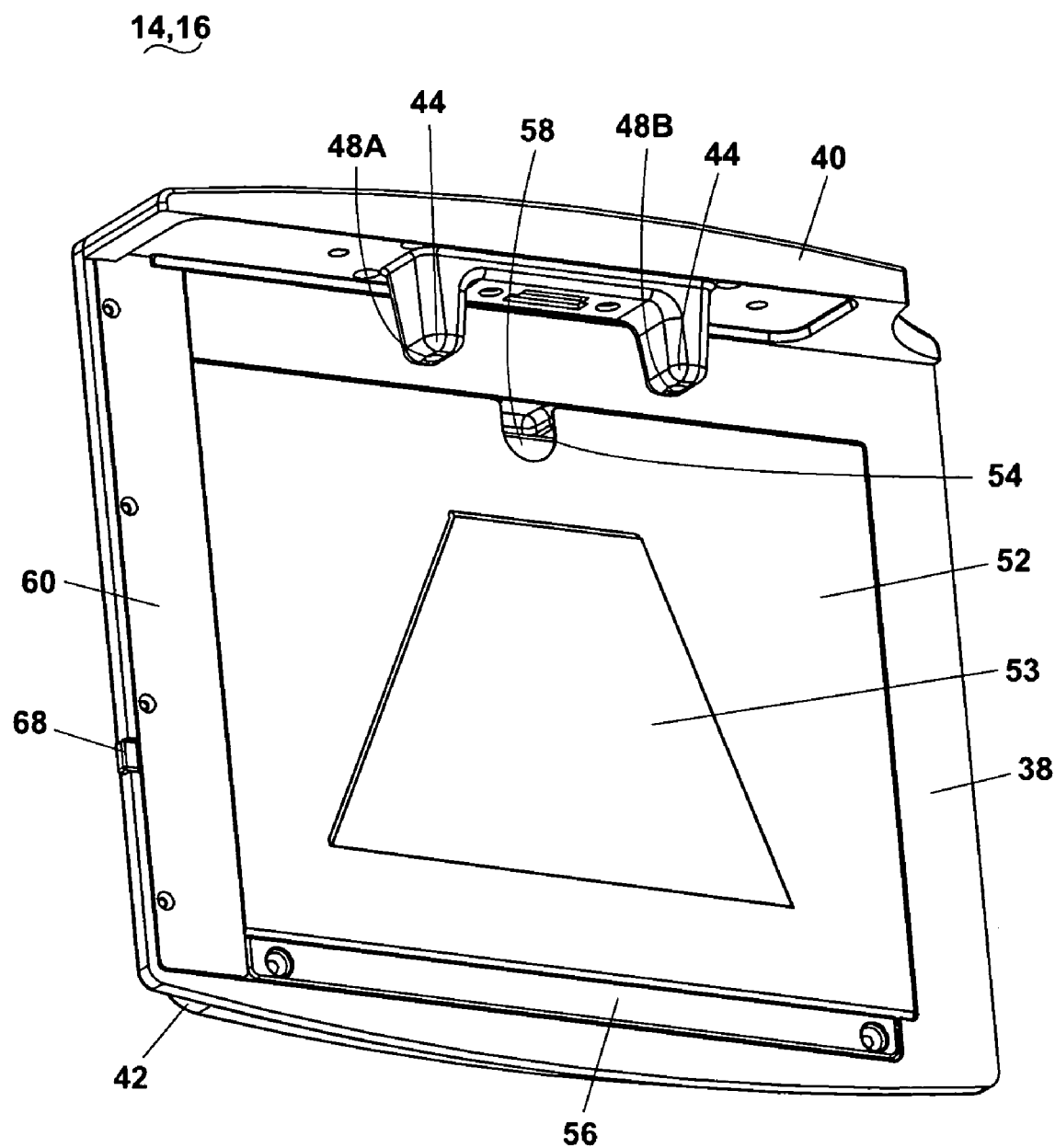
FIG. 6 is a rear perspective view of the adapter and the digital image display, which form a functional unit, of FIG. 4.
Figure 7:
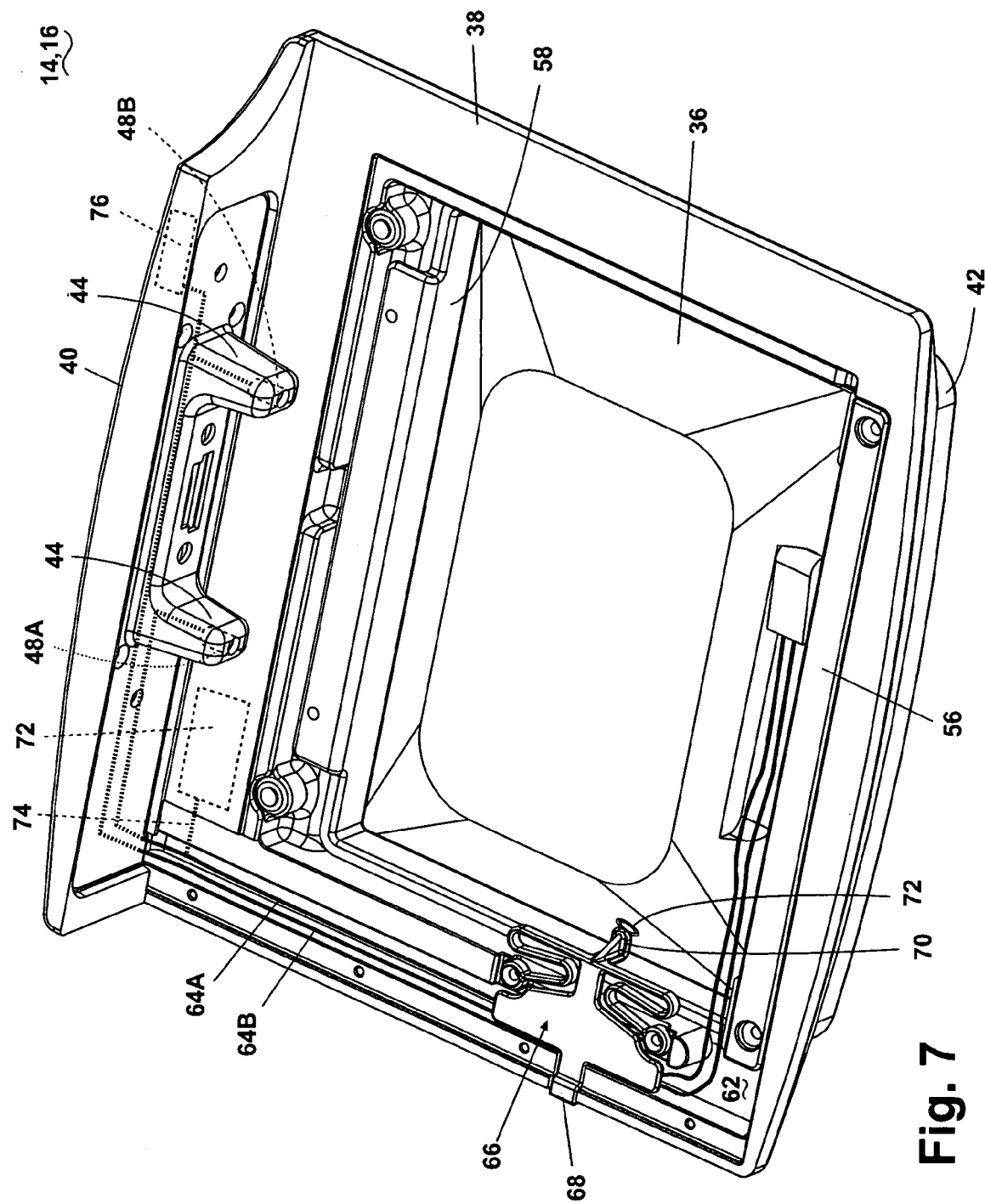
FIG. 7 is a rear perspective view similar to FIG. 6 with a rear access panel of the functional unit removed.

Referring now to FIG. 6, a first rear access panel 52 removably mounted to a rear side of the main body 38 of the adapter 14 enables user access to the digital image display 36. When the first rear access panel 52 is removed, as illustrated in FIG. 7, the user can access the digital image display 36, such as for repair or replacement. The first rear access panel 52 can include a stand 53 to facilitate utilizing the functional unit comprising the adapter 14 and the consumer electronic device 16 when removed from the host 12. A finger slot 54 on the rear access panel 52 facilitates handling of the rear access panel 52 by a user. To help position and retain the first rear access panel 52 on the adapter 14, the adapter 14 comprises a retainer 56 having a slot configured to receive a lower edge of the first rear access panel 52. Between the first rear access panel 52 and the digital image display 36, a clamp 58 having a shape generally corresponding to the perimeter of the of the digital image display 36 secures the digital image display 36 to the main body 36, whereby the digital image display 36 is sandwiched between the clamp 58 and the frame 42.

Referring back to FIG. 6, the adapter 14 further comprises a second rear access panel 60, which, when removed from the adapter 14, enables user access to a channel 62, as shown in FIG. 7. The channel 62 receives a first wire 64A coupling one of the receptacles 48A with the digital image display 36 and a second wire 64B coupling the other of the receptacles 48B with the digital image display 36. The first wire 64A establishes power communication between the receptacle 48A and the digital image display 36, while the second wire 64B establishes data communication between the receptacle 48B and the digital image display 36. The first and second wires 64A, 64B can be removably coupled to the digital image display 36 so that the digital image display 36 can be removed from the adapter 14 if desired. The channel 62 further receives a power actuator 66 having a finger tab 68 extending laterally from the channel 62 and beyond a side of the main body 38 for access by a user and an actuating protrusion 70 extending laterally from the channel 62 toward the digital image display 36. Depression of the finger tab 68 by the user moves the actuating protrusion 70 laterally into contact with a power switch 72 on the digital image display 36.

The adapter 14 further comprises means for supplying a service when the adapter 14 and the consumer electronic device 16, which is the digital image display 36 in this embodiment, are removed from the host 12. In particular, the stand 53, which is shown in FIG. 6, provides and supplies mechanical communication when the adapter 14 and the digital image display 36 are removed from the host 12, and a power source 72 and a data communication device 76, which are shown schematically in FIG. 7, supply and provide power communication and data communication, respectively, to the digital image display 36 when the adapter 14 and the digital image display 36 are removed from the host 12.

The power source 72 can be any suitable device that provides power to the digital image display 36. The power source 72 can be coupled to the receptacle 48A associated with power communication, such as via the first wire 64A by a connection 74. Optionally, the power source 72 can be rechargeable and can be recharged via the receptacle 48A when the adapter 14 is coupled to the host 12. For example, the power source 72 can be a rechargeable battery, such as any well-known type of rechargeable battery, including rechargeable NiMH, Ni—Cd, and Li-ion batteries. Another example of the rechargeable power source 72 can be a manually powered electric generator, such as a hand crank electric generator. As another option, the power source 72 can be a stand-alone power source that does not couple with the receptacle 48A associated with power communication. In this case, the power source 72 can be removable and recharged externally of the adapter 14. For example, the power source 72 can be a rechargeable battery that can be removed from the adapter 14, recharged, and returned to the adapter 14. Alternatively, the power source 72 can be a non-rechargeable battery that can be removed and replaced when drained of power. When the power source 72 is rechargeable, the adapter 14 can include an indicator, such as a visual indicator comprising a light, communicating to the user a charging state, such as fully charged, fully drained, and currently charging, of the power source 72. As another option, the power source 72 can be a receptacle for receiving a plug of a cord that couples the adapter 14 to an external power source, such as a wall socket. For example, the digital image display 36 can include a receptacle for receiving a plug of an electrical cord coupled to an external power supply, and the adapter 14 can comprise a plug that mimics the plug on the electrical cord and a receptacle that mimics the receptacle on the digital image display 36. As a result of this configuration, the receptacle on the digital image display 36 can receive the plug on the adapter 14 to couple the digital image display 36 to the adapter 14, and the receptacle on the adapter 14 can be coupled to the plug of the electrical cord for supplying power to the digital image display 36 from the external power supply. The electrical cord, therefore, can be used both with the digital image display 36 alone and with the digital image display 36 coupled to the adapter 14. The power source 72 can be coupled to the digital image display 36 in any suitable manner and is shown as being coupled to the digital image display 36 via the connection 74 and the first wire 64A for exemplary purposes only.

The data communication device 76 can be any suitable device that provides data communication to the digital image display 36. For example, the data communication device 76 can comprise a wireless device, such as a wireless network adapter or modem, that wirelessly connects to a communication network, such as the Internet. Alternatively, the data communication device 76 can comprise a device, such as a network adapter or modem, that includes a port to receive a wired connection to a communication network, such as the Internet. The data communication device 76 can be employed, for example, to connect the digital image display 36 to a URL for receiving image files for display on the digital image display 36. The data communication device 76 can be coupled to the digital image display 36 in any suitable manner and is shown as being coupled to the digital image display 36 via the second wire 64B for exemplary purposes only.

In operation, a user mounts the adapter 14 and the digital image display 36 to the refrigerator 30 by inserting the anchors 44 into the anchor receivers 46, whereby the plugs 50 are inserted into the receptacles 48A, 48B to establish the power and data communication. In this configuration, the adapter 14 and the digital image display 36 hang from the refrigerator door 32, as shown in FIG. 1.

Figure 8:
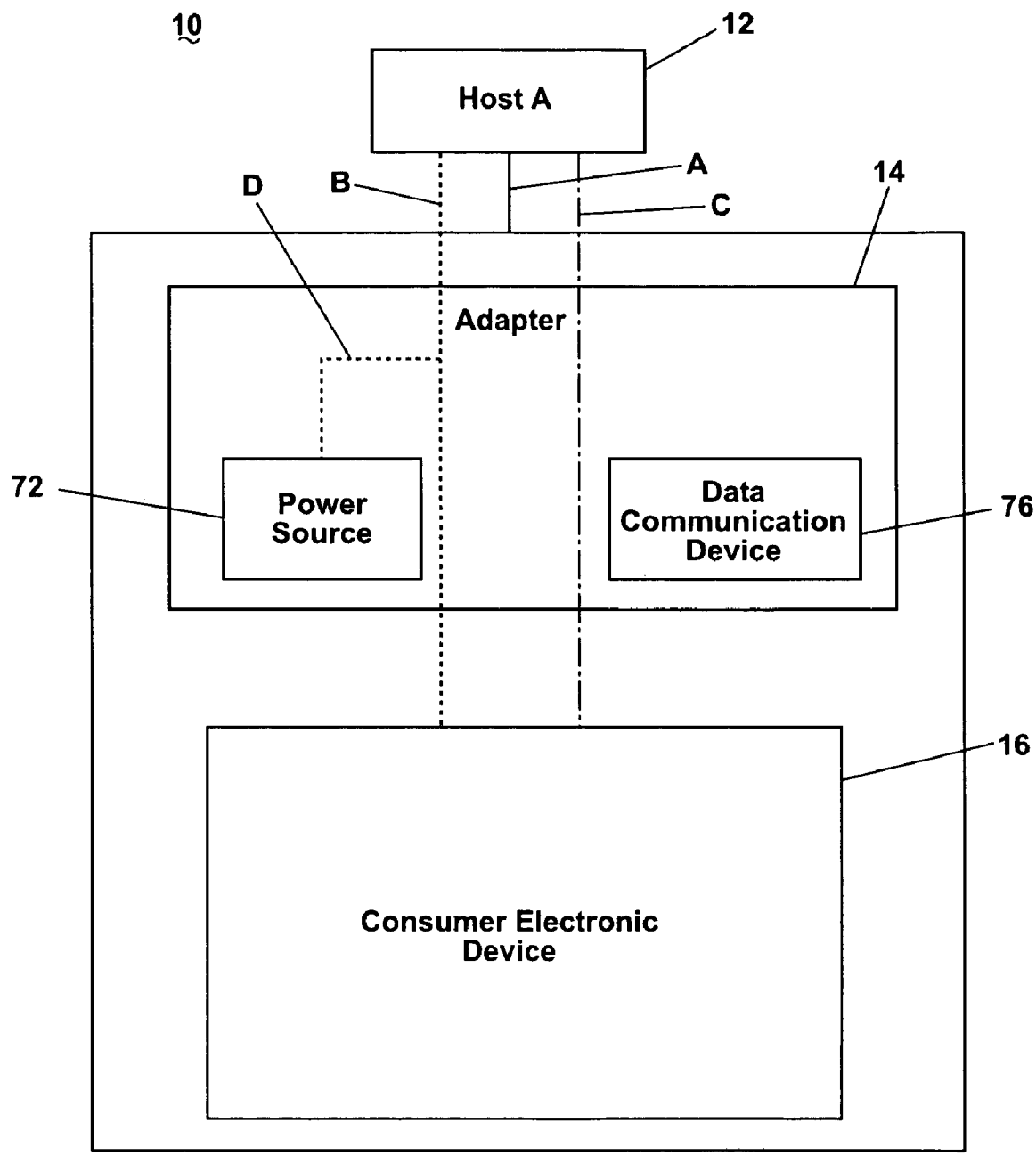
FIG. 8 is a schematic view of the modular system of FIG. 1 when the functional unit comprising the adapter and the consumer electronic device is coupled to the host.

The mechanical, power, and data communication in the modular system 10 when the adapter 14 and the digital image display 36 are coupled to the host 12 is illustrated schematically in FIG. 8. In particular, the anchors 44 supply the mechanical communication between the host 12 and the consumer electronic device 36, as indicated by the solid line A; the adapter 14 supplies power communication from the host 12, i.e., the refrigerator 30, to the consumer electronic device 16, i.e., the digital image display 36, as indicated by the dotted line B; and the adapter 14 supplies data communication from the host 12, i.e., the refrigerator 30, to the consumer electronic device 16, i.e., the digital image display 36, as indicated by the dash-dot-dash line C. Additionally, the power source 72, if comprising a rechargeable power source, can be recharged from the power communication from the host 12, as indicated by the dotted line D.

Figure 9:
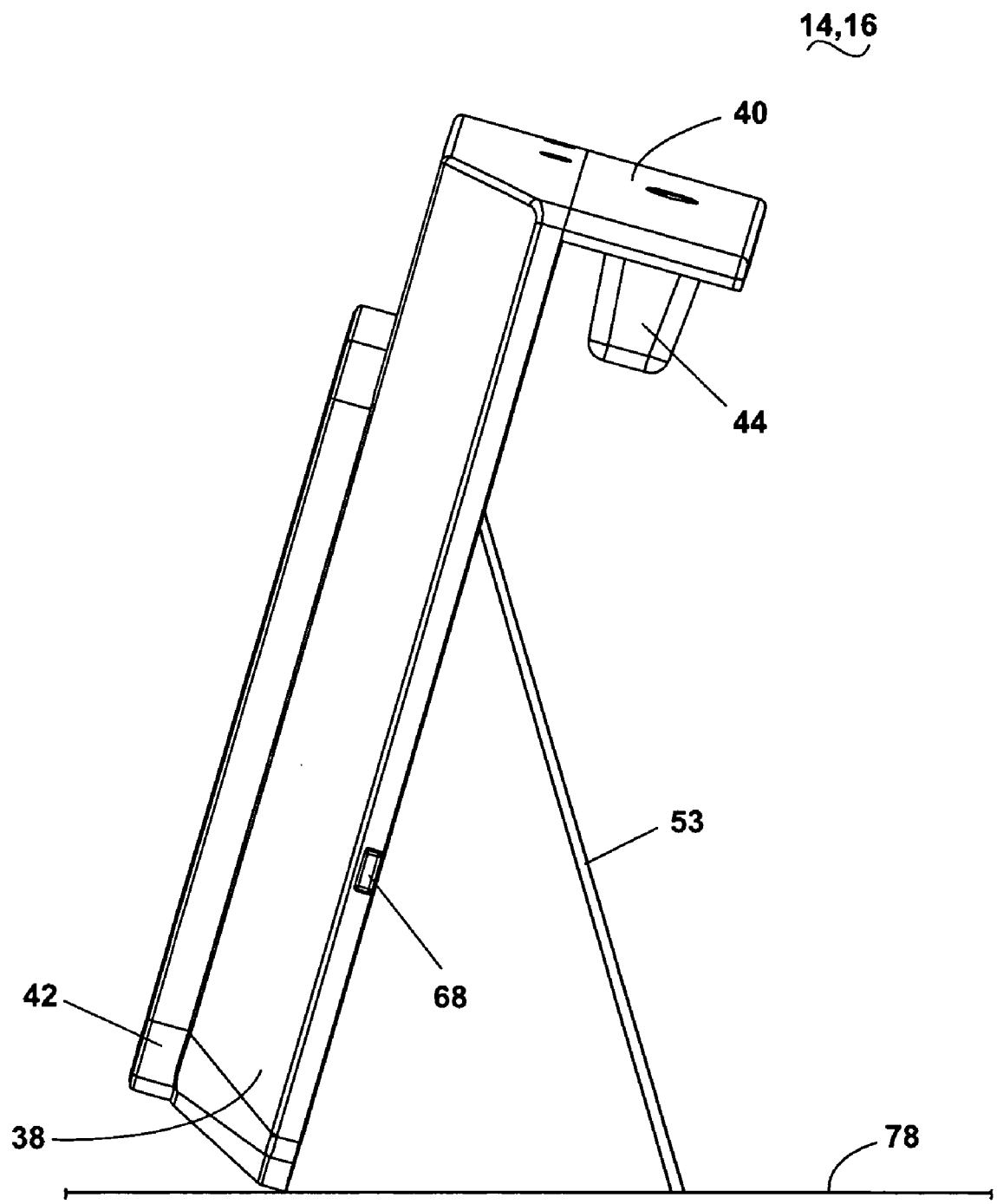
FIG. 9 is a side view of the adapter and the digital image display of FIG. 4 removed from the host and supported by a stand on a generally horizontal surface.

To remove the digital image display 36 from the refrigerator 30, the user removes the anchors 44 from the anchor receivers 46, whereby the plugs 50 are removed from the receptacles 48A, 48B. This process discontinues the supply of the mechanical, power, and data communication between the refrigerator 30 and the digital image display 36. However, as described above, the adapter 14 and the digital image display 36 form a functional unit that can function or be of use independently of the refrigerator 30. For example, the stand 53 on the adapter 14 can be utilized to support the adapter 14 and the digital image display 36 on a generally horizontal surface 78, as illustrated in FIG. 9, in a manner similar to supporting a conventional picture frame on a generally horizontal surface.

Figure 10:
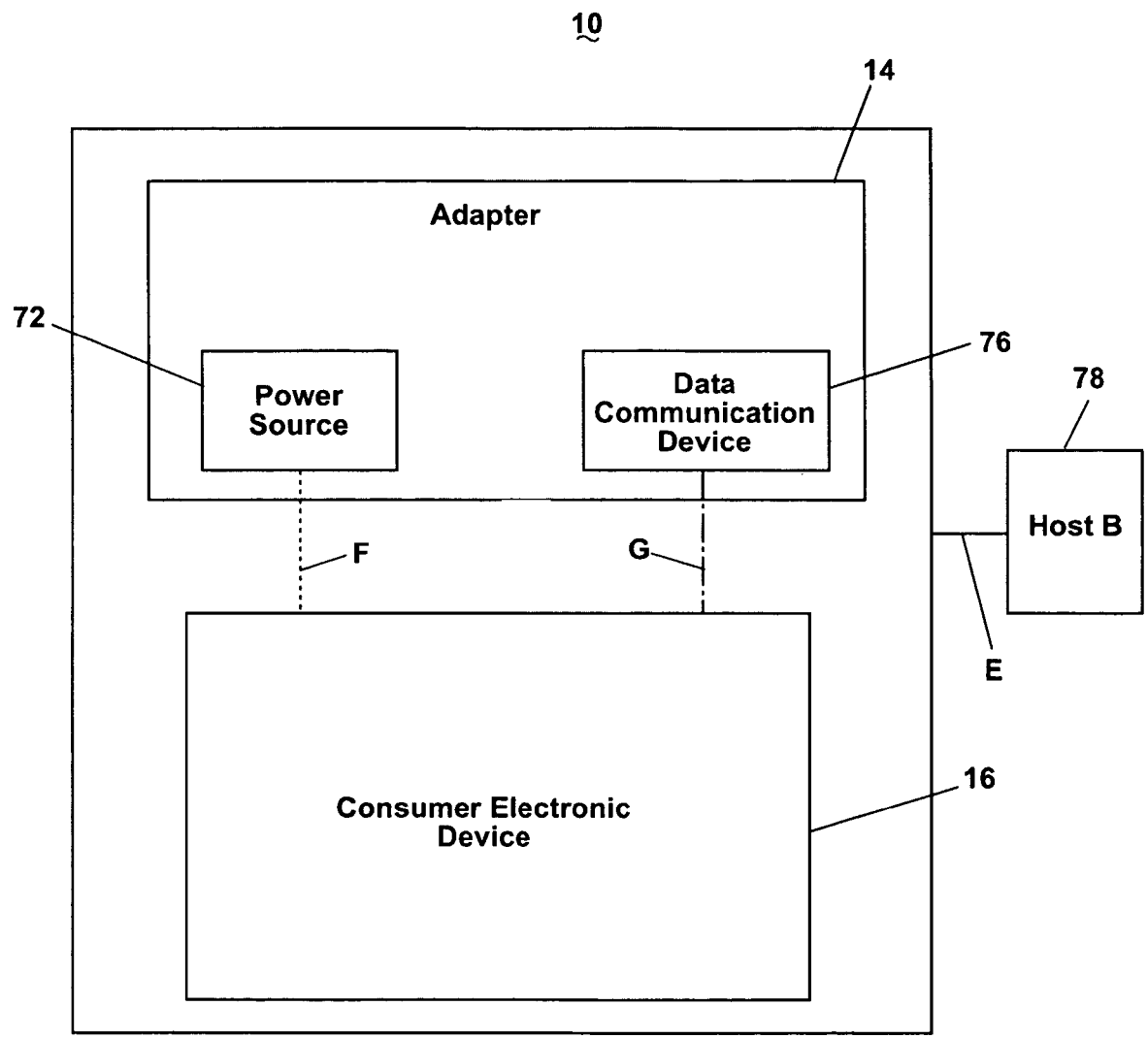
FIG. 10 is a schematic view of the modular system of FIG. 1 when the functional unit comprising the adapter and the consumer electronic device is removed from the host.

The mechanical, power, and data communication in the modular system 10 when the adapter 14 and the digital image display 36 are removed from the host 12 is illustrated schematically in FIG. 10. In particular, the stand 53 provides and supplies mechanical communication between the generally horizontal surface 78, which is shown as another host in FIG. 10, and the consumer electronic device 16, i.e., the digital image display 36, as indicated by the solid line E; the power source 72 of the adapter 14 provides and supplies power communication to the consumer electronic device 16, i.e., the digital image display 36, as indicated by the dotted line F; and the data communication device 76 of the adapter 14 provides and supplies data communication to the consumer electronic device 16, i.e., the digital image display 36, as indicated by the dash-dot-dash line G.

While the functional unit comprising the adapter 14 and the digital image display 36 is shown and described as being coupled to another host when removed from the host 12, it is not required that the functional unit be coupled with another host when removed from the host 12. The functional unit can function or be of use without another host, such as when held in the hands of a user. Furthermore, it is not required that the adapter 14 supply all three of the mechanical, power, and data communication services when the functional unit is removed from the host 12; the adapter 14 need only supply one service to the digital image display 16 when the adapter 14 and the digital image display 16 are removed from the host 12. In one example, the adapter 14 supplies only the mechanical communication, while the digital image display 36 has its own internal power supply, such as a rechargeable or non-rechargeable battery, and a memory, either integrated or removable, that stores the image files for display, rather than relying on data communication for the image files.

In one aspect, the adapter 14 of the functional unit can be thought of as providing and supplying to the consumer electronic device 16, when removed from the host 12, one or more services provided by the host 12 and supplied by the adapter 14 when the consumer electronic device 16 is coupled to the host 12. In other words, the adapter 14 replaces one or more services that the host 12 provides. However, the adapter 14 need not provide the service; rather, another host or device can provide the service when the adapter 14 and the consumer electronic device 16 are removed from the host 12, and the adapter 14 can supply the service from the other host or device to the consumer electronic device 16. For example, the adapter 14 can comprise means for coupling the other host or device to the consumer electronic device 16. However, it is not necessary for another host or device to provide the service; the service can be inherent to the functional unit.

Figure 11:
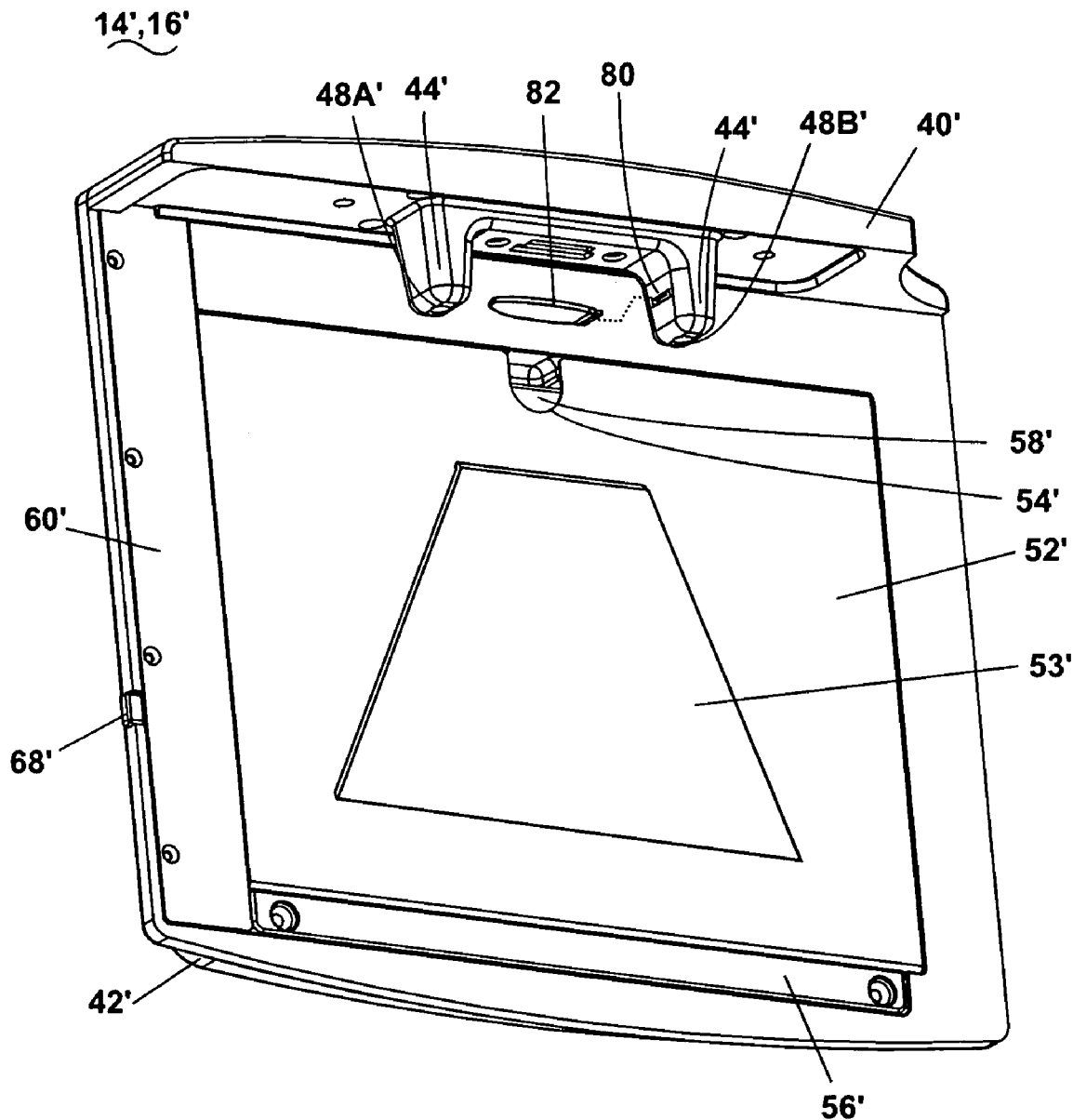
FIG. 11 is a perspective view similar to FIG. 6 of another embodiment of the adapter and digital image display.

Another embodiment of the functional unit comprising the adapter 14' and the consumer electronic device 16' in the form of the digital image display 36' is illustrated in FIG. 11, where components similar to those of the embodiment of the functional unit in FIG. 4 are identified with the same reference numeral bearing a prime symbol ('). The functional unit of FIG. 11 is substantially identical to that of FIG. 4, except that the functional unit of FIG. 11 includes a USB receptacle 80, which can be employed in addition to or in place of the power source 72 and/or the data communication device 76. For example, the USB receptacle 80 can receive an external provider in the form of a USB fob 82 that provides power and/or data communication, which the adapter 14' supplies to the digital image display 36'. Alternatively or additionally, the USB fob 82 can provide memory that stores the image files, which the adapter 14' supplies to the digital image display 36' for display. The USB fob 82 can provide any suitable service, which the adapter 14' supplies to the digital image display 36'.

In other embodiments, the external provider can have any form, and the USB fob is only one example of the external provider. Other examples of an external provider are the manually powered electric generator and a battery pack, which can be coupled to the adapter 14, 14' when the adapter 14, 14' is coupled with the host 12 or is separate from the host 12.

Figure 12:
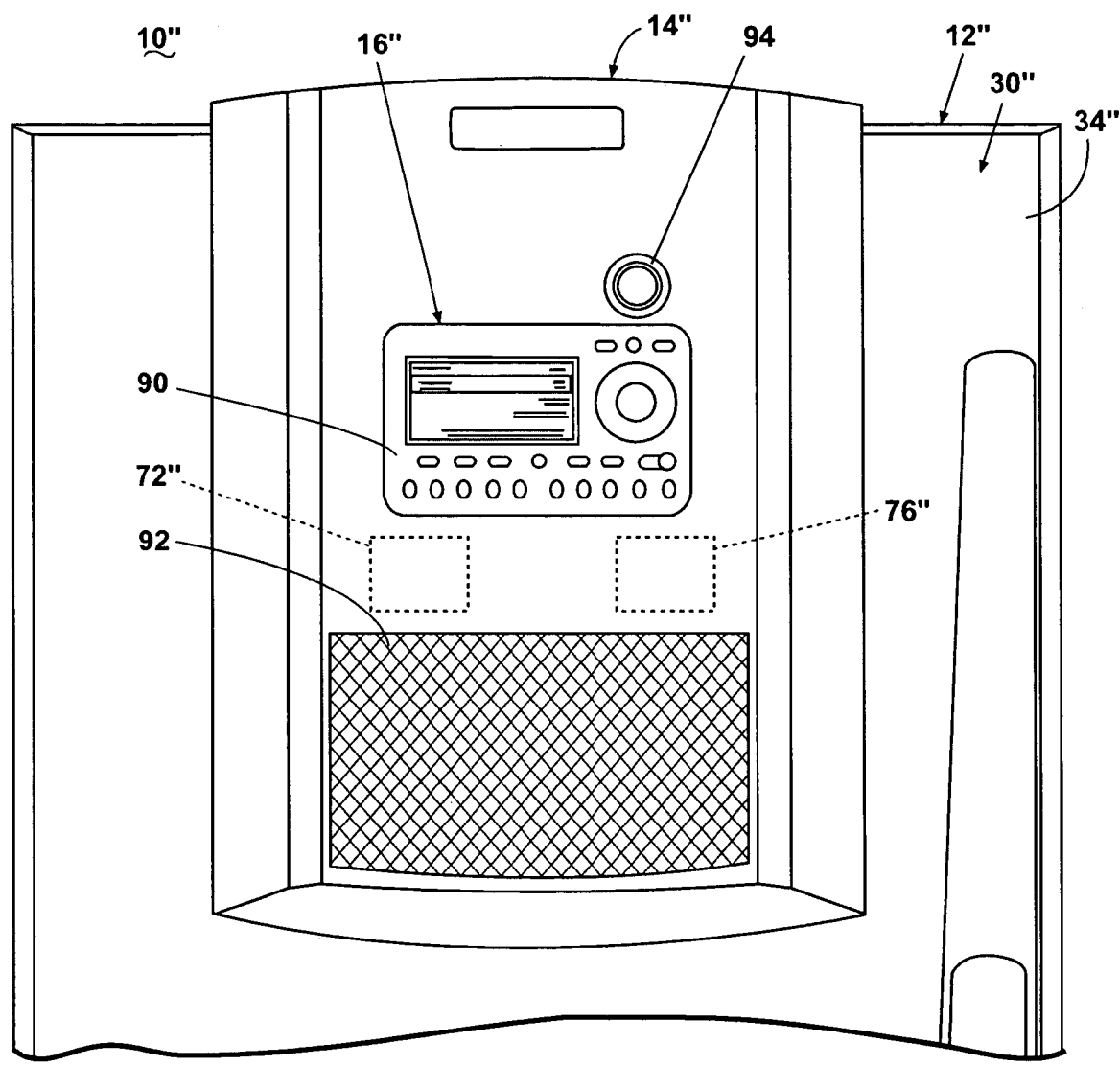
FIG. 12 is a front view of another embodiment of the modular system of FIG. 1 comprising a refrigerator as the host, the adapter, and an audio device as the consumer electronic device.

An alternative embodiment of the modular system 10" having the functional unit comprising the adapter 14" and the consumer electronic device 16" is illustrated in FIG. 12. In this embodiment, the consumer electronic device 16" is in the form of an audio device 90. The adapter 14" is similar to the adapters 14, 14' of FIGS. 4 and 11, except that the adapter 14" supports the audio device 90 rather than the digital image display 36 and also includes a speaker 92 and a speaker volume actuator 94. Examples of the audio device 90 include, but are not limited to, a radio, a satellite radio, a CD player, and a digital audio player, such as an mp3 player. The audio device 90 of the illustrated embodiment is a satellite radio, and the data communication device 76" of the adapter 14" can be in the form of an antenna for the satellite radio.

In operation, the functional unit comprising the adapter 14" and the audio device 90 in the form of the satellite radio can be mounted to the host 12 in the form of the refrigerator 30", as shown in FIG. 12, whereby the adapter 14" supplies mechanical, power, and data communication between the host 12" and the audio device 90. The functional unit can be removed from the host 12" and function or be of use independently of the host 12". For example, the power supply 72" of the adapter can provide and supply power communication to the audio device 90, and the data communication device 76" can provide and supply data communication to the audio device 90. The functional unit can also be supported on a generally horizontal surface with the stand 53" (not shown in FIG. 12) or other mechanical support.

Figure 13:
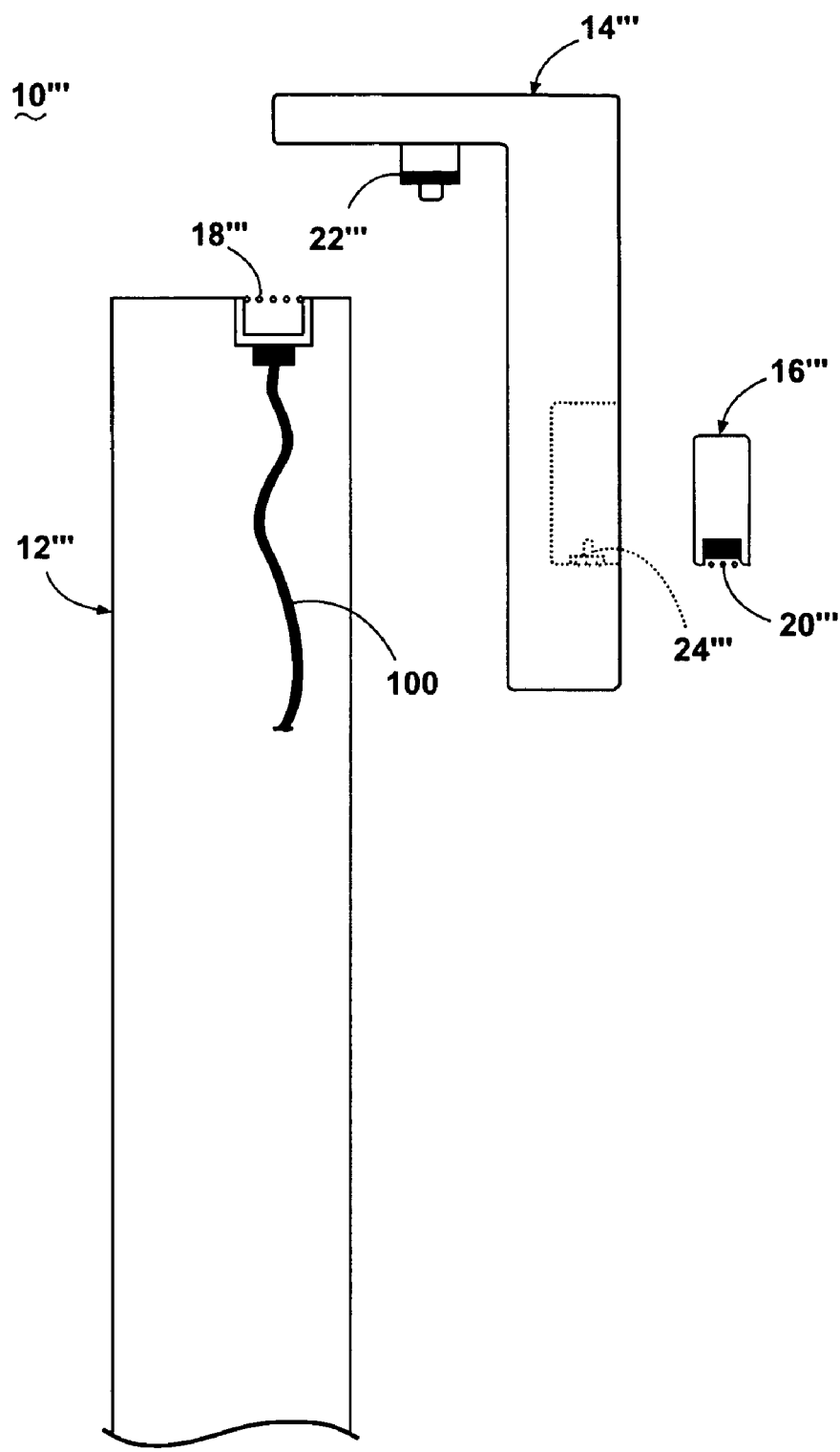
FIG. 13 is a schematic view of another embodiment of the modular system of FIG. 1.

Another embodiment of the modular system 10''' having the functional unit comprising the adapter 14''' and the consumer electronic device 16''' is illustrated in FIG. 13. FIG. 13 is a schematic drawing showing generic embodiments of the host 12''', the adapter 14''', and the consumer electronic device 16''' and the corresponding host, adapter, and device service interfaces 18'''-24'''. Electrical power and/or data can be provided by the host 12''' to the host service interface 18''' through an electrical/data connection with the host 12''', indicated by a wire 100 terminating at the host service interface 18'''. In this embodiment, the host service interface 18''' on the host 12''' and the device service interface 20''' on the device 16''' are incompatible, such as mechanically incompatible or electrically incompatible. When the service interfaces 18''', 20''' are mechanically incompatible, the host service interface 18''' and the device service interface 20''' cannot be physically connected to each other. For example, the host and device service interfaces 18''', 20''' can be of a different size or shape or have a different number, arrangement, or shape of connector pins and pin receptacles. When the service interfaces 18''', 20''' are electrically incompatible, the host service interface 18''' and the device service interface 20''' have differing electrical configurations. For example, the host service interface 18''' can be configured to supply AC power while the device service interface 20''' can be configured to receive DC power.

The adapter 14''' couples the consumer electronic device 16''' to the host 12''' and remedies the incompatibility of the host and device service interfaces 18''', 20'''. In particular, the first adapter service interface 22''' is configured, such as mechanically and/or electrically, to mate with the host service interface 18''', and the second adapter service interface 24''' is configured, such as mechanically and/or electrically, to mate with the device service interface 20'''. As a result of the host service interface 18'''/first adapter service interface 22''' compatibility and of the device service interface 20'''/second adapter service interface 24''' compatibility, the adapter 14''' enables the consumer electronic device 16''' to couple with the host 12'''.

When the consumer electronic device 16''' and the adapter 14''' are coupled with the host 12''', the adapter 14''' can supply at least one service between the host 12''' and the consumer electronic device 16'''. Further, as in the previous embodiments described above, the consumer electronic device 16''' and the adapter 14''' form a functional unit that can function or be of use as a stand-alone unit when not coupled with the host 12'''. The second adapter interface 24''' and the device adapter interface 20''' can, therefore, also serve as a connector for removably coupling the consumer electronic device 16''' to the adapter 14''' when the consumer electronic device 16''' and the adapter 14''' are used as a stand-alone unit separate from the host 12''' as well as when the consumer electronic device 16''' and the adapter 14''' are coupled to the host 12'''. The first adapter interface 22''' and the host adapter interface 18''' serve as a connector for removably coupling the adapter 14''' to the host 12''' when the adapter 14''' is coupled to the host 12'''.

All of the disclosed embodiments of the adapter and consumer electronic device have the unique ability to function as a stand-alone unit when uncoupled from the host, which is also portable. The adapter of the combination can provide and supply a service to the consumer electronic device when operating as a stand-alone unit. The adapter can also provide a function that is different from the service.

While the invention has been specifically described in connection with certain specific embodiments thereof, it is to be understood that this is by way of illustration and not of limitation, and the scope of the appended claims should be construed as broadly as the prior art will permit.

What is claimed is:

1. An adapter for removably mounting an electronic device performing a first information function to an appliance performing a cycle of operation on a consumer article, the adapter comprising:
   an adapter main body adapted to removably couple the electronic device to the appliance,
   a first component on the adapter main body and providing a first mechanical support service between the appliance and the electronic device when the adapter is coupled to the appliance and the electronic device is coupled to the adapter,
   a second component on the adapter main body and providing a second mechanical support service to the electronic device when the adapter and the electronic device are removed from the appliance, and
   a third component on the adapter main body and providing a second information function independent of the electronic device.

2. The adapter of claim 1, wherein the electronic device comprises an image display.

3. The adapter of claim 1, wherein the electronic device comprises an audio device.

4. The adapter of claim 1, wherein the electronic device comprises a radio.

5. The adapter of claim 1, wherein the third component comprises a writing surface.

6. The adapter of claim 1, wherein the adapter main body further comprises a physical storage compartment.

7. The adapter of claim 6, wherein the physical storage compartment provides storage for items used in connection with the use of the electronic device.

8. The adapter of claim 1, wherein the second component comprises a stand that supports the adapter on a generally horizontal surface.

9. The adapter of claim 8, wherein the stand is retractable.

10. The adapter of claim 1, wherein the electronic device is coupled to the adapter by a fixed coupling.

11. The adapter of claim 1, wherein the electronic device is coupled to the adapter by a removable coupling.

12. The adapter of claim 1 wherein the further comprising a power source to provide power communication as the second service to the consumer electronic device.

13. The adapter of claim 12 wherein the power source is recharged when the adapter is coupled to the host.

14. The adapter of claim 13 wherein the power source is a rechargeable battery.

15. The adapter of claim 1 adapter further comprising a data communication device to provide data communication as the second service to the consumer electronic device.

16. The adapter of claim 15 wherein the data communication device comprises a wireless data communication device.

17. The adapter of claim 1, wherein the first component comprises a hanger.

18. The adapter of claim 1, wherein at least one of the first and second information functions provides scheduling information.

19. The adapter of claim 1, wherein at least one of the first and second information functions provides messages.

20. An adapter for removably mounting an electronic device performing a first information function to an appliance performing a cycle of operation on a consumer article, the adapter comprising:
    an adapter main body adapted to removably couple the electronic device to the appliance, the adapter main body providing:
        a first mechanical support service between the appliance and the electronic device when the adapter is coupled to the appliance and the electronic device is coupled to the adapter,
        a second mechanical support service to the electronic device when the adapter and the electronic device are removed from the appliance;
        a second information function independent of the electronic device; and
        an additional function in addition to the mechanical support and information functions.

21. The adapter of claim 20, wherein the electronic device is coupled to the adapter by a fixed coupling.

22. The adapter of claim 20, wherein the additional function comprises power storage.

23. The adapter of claim 20, wherein the additional function comprises a microphone.

24. The adapter of claim 20, wherein the additional function comprises a power source.

25. The adapter of claim 20, wherein the additional function comprises data storage.

26. The adapter of claim 20, wherein the second information function can operate independently of the appliance.

27. The adapter of claim 20, wherein the electronic device is coupled to the adapter by a removable coupling.

* * * * *